(12) United States Patent
Kumar et al.

(10) Patent No.: US 10,948,307 B2
(45) Date of Patent: Mar. 16, 2021

(54) ENHANCED ROUTE SELECTION TECHNIQUES FOR ELECTRIC VEHICLES

(71) Applicant: QUALCOMM Incorporated, San Diego, CA (US)

(72) Inventors: Akash Kumar, Hyderabad (IN); Ankita, Hyderabad (IN); Amit Jain, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 72 days.

(21) Appl. No.: 16/114,343

(22) Filed: Aug. 28, 2018

(65) Prior Publication Data

US 2020/0072626 A1 Mar. 5, 2020

(51) Int. Cl.
*G01C 21/00* (2006.01)
*G01C 21/34* (2006.01)
*G01C 21/36* (2006.01)

(52) U.S. Cl.
CPC ..... *G01C 21/3469* (2013.01); *G01C 21/3658* (2013.01); *G01C 21/3697* (2013.01)

(58) Field of Classification Search
USPC .......................................................... 701/410
See application file for complete search history.

(56) References Cited

U.S. PATENT DOCUMENTS 5,821,728 A * 10/1998 Schwind ............... H01M 10/44
320/108
2011/0246019 A1 10/2011 Mineta
2013/0275033 A1 * 10/2013 Bastiaensen ........... G01C 21/26
701/119
2016/0138925 A1 * 5/2016 Takahashi .......... G01C 21/3697
701/533
2017/0136889 A1 * 5/2017 Ricci ..................... B60L 11/182
2018/0143029 A1 5/2018 Nikulin et al.
2019/0120654 A1 * 4/2019 Todasco ............ G01C 21/3476

FOREIGN PATENT DOCUMENTS

EP 2306153 A2 4/2011
JP 2012047670 A 3/2012
WO WO-2018176678 A1 * 10/2018 .............. B60L 53/12

OTHER PUBLICATIONS

WO 2018176678-A1, Wireless charging road system and wireless charging vehicle, inventors Zhang, Ruifeng • Wu, JIN • Wang, Haifan, Priority, CN 201710189628 A (Mar. 27, 2017) Filing Date: Jul. 7, 2017, English translation from IP.com (Year: 2017).*
International Search Report and Written Opinion—PCT/US2019/046477—ISA/EPO—dated Jan. 10, 2020.
Partial International Search Report—PCT/US2019/046477—ISA/EPO—dated Nov. 13, 2019.

* cited by examiner

*Primary Examiner* — James M McPherson

(57) ABSTRACT

A navigation device and method provide a route to a destination. The navigation device includes a processor configured to receive a starting location at a navigation device associated with a user and receive a destination location at the navigation device. The navigation device also includes a display including a user interface configured to display one or more routes from the starting location to the destination location with an indication of a charging metric of each of the one or more routes.

29 Claims, 7 Drawing Sheets

ENHANCED ROUTE SELECTION TECHNIQUES FOR ELECTRIC VEHICLES

FIELD

This disclosure relates generally to methods and devices for enhanced route selection techniques for electric vehicles and, more particularly, to methods and devices for enabling users to plan routes with special considerations for electric vehicles.

BACKGROUND

Current route selection techniques rely primarily on distance between an origin and destination. More recently, traffic data has been used to select a route between the origin and destination that optimizes time to the destination. This is beneficial for humans because it minimizes the amount of time they are required to drive and humans can handle any unexpected events that occur while they are driving.

As electric vehicles and autonomous vehicles become more prevalent, some entities may add inductive charging functionality to roads. In some implementations, a current is provided through one or more coils placed under a surface of the road, causing an electromagnetic field to be created above the road surface. As the electric vehicle travels along the road, a resulting current may be induced in conductors within the electric vehicle. This current may be used to recharge one or more batteries within the electric vehicle. However, a user may not be aware of which roads (or which lanes of each road) may have this charging capability. As a result, these charging lanes may be underutilized by the vehicles designed to take advantage of the charging capability. In addition, users may not have all the information needed to determine an optimal route for their individual vehicle's current status and capability.

SUMMARY

An example of a navigation device for determining a route to a destination includes a processor configured to receive a starting location at a navigation device associated with a user and receive a destination location at the navigation device. The navigation device also includes a display coupled to the processor, the display comprising a user interface configured to display one or more routes from the starting location to the destination location with an indication of a charging metric of each of the one or more routes.

An example method of providing a route to a destination includes receiving a starting location at a navigation device associated with a user and receiving a destination location at the navigation device. The method also includes displaying one or more routes from the starting location to the destination location with an indication of a charging metric of each of the one or more routes.

Another example of a navigation device for providing a route to a destination includes means for receiving a starting location at a navigation device associated with a user and means for receiving a destination location at the navigation device. The navigation device also includes means for displaying one or more routes from the starting location to the destination location with an indication of a charging metric of each of the one or more routes.

An example of a non-transitory computer-readable medium stores instructions that, when executed by a processor, cause the processor to receive a starting location at a navigation device associated with a user and receive a destination location at the navigation device. The instructions also cause the processor to display one or more routes from the starting location to the destination location with an indication of a charging metric of each of the one or more routes.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

In some aspects described herein, a navigation device may be operated by a user and may be associated with a fully electric vehicle or a hybrid electric vehicle (collectively referred to as "electric vehicles"). The navigation device may be a mobile device such as a smartphone or a standalone portable navigation unit, may be integrated within the vehicle (e.g., as part of a navigation system of the vehicle), or may be any other suitable device that performs the functions described herein.

The navigation device may be configured to receive a starting location and a destination location from a user, for example, and may provide one or more routes from the starting location to the destination location. In one aspect, the navigation device receives the routes from a route management server in response to the navigation device transmitting the starting location and the destination location to the route management server along with a request to provide a route between the locations. In another aspect, the navigation device may be standalone (i.e., not reliant upon a server for the route information) and may determine the one or more routes based on data stored in memory.

The navigation device may also receive charging lane information identifying a charging capability for one or more lanes of the roads within the route or routes. In some aspects, the navigation device may receive the charging lane information from the route management server. Alternatively, the navigation device may receive the charging lane information from a memory of the navigation device. The navigation device may then determine a charging metric for each of the routes based on the charging lane information. The navigation device may then display each route to the user along with each route's associated charging metric. These and other aspects are discussed in detail below.

Figure 1:
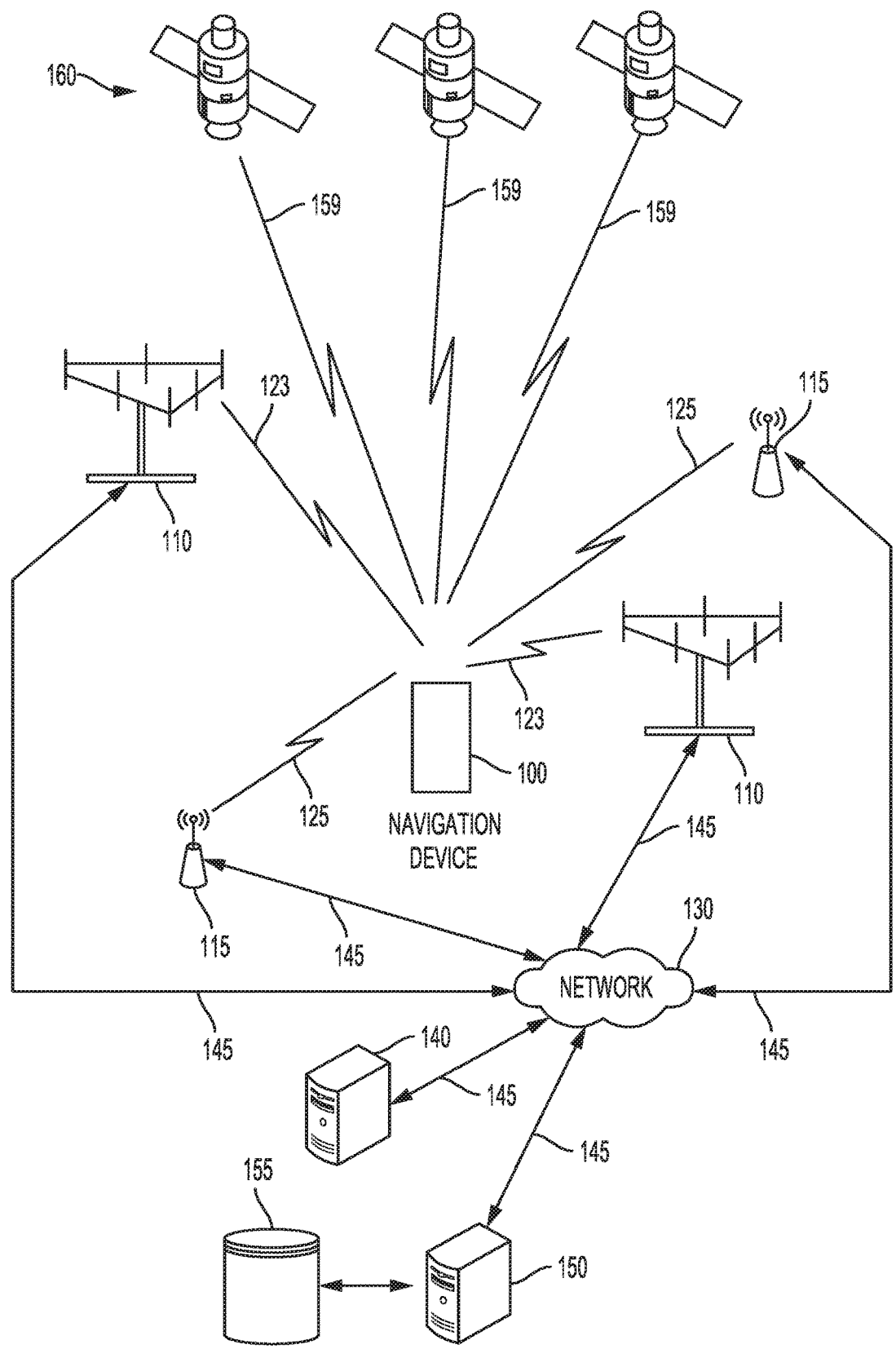
FIG. 1 is a block diagram of an example of a system in which various aspects of the disclosure may be implemented.

As shown in FIG. 1 in a particular implementation, a navigation device 100 may transmit radio signals to, and receive radio signals from, a wireless communication network. In some implementations, navigation device 100 may be a mobile device. In other implementations, navigation device 100 may be a navigation system or subsystem of an automobile or another suitable vehicle. For example, navigation device 100 may be, or may be included within, a navigation system of an electric vehicle (EV), such as a fully electric vehicle (FEV) or a hybrid electric vehicle (HEV). Such vehicles may be fully or partially autonomous, or may be manually operated. Vehicles that have chargeable batteries, such as FEVs and plug-in HEVs, are collectively referred to herein as electric vehicles (EVs).

Mobile devices described herein may also be referred to, for example, as a wireless device, a mobile terminal, a terminal, a mobile station (MS), a user equipment (UE), a SUPL Enabled Terminal (SET) or by some other name. Mobile devices may include, without limitation, a cellphone, smartphone, laptop, tablet, PDA, tracking device, standalone portable navigation unit, and wearable device (e.g., smart watch or extended reality glasses). Typically, though not necessarily, a mobile device may support wireless communication such as using GSM, WCDMA, LTE, CDMA, HRPD, WiFi, BT, WiMax, etc. A mobile device may also support wireless communication using a wireless LAN (WLAN), DSL or packet cable for example. A mobile device may comprise a single entity or may comprise multiple entities such as in a personal area network where a user may employ audio, video and/or data I/O devices and/or body sensors and a separate wireline or wireless modem.

An estimate of a location of a mobile device (e.g., navigation device 100) may be referred to as a location, location estimate, location fix, fix, position, position estimate or position fix, and may be geographic, thus providing location coordinates for the mobile device (e.g., latitude and longitude) which may or may not include an altitude component (e.g., height above sea level, height above or depth below ground level, floor level or basement level). Alternatively, a location of a mobile device may be expressed as a civic location (e.g., as a postal address or the designation of some point or small area in a building such as a particular room or floor). A location of a mobile device may also be expressed as an area or volume (defined either geographically or in civic form) within which the mobile device is expected to be located with some probability or confidence level (e.g., 67% or 95%). A location of a mobile device may further be a relative location comprising, for example, a distance and direction or relative X, Y (and Z) coordinates defined relative to some origin at a known location which may be defined geographically or in civic terms or by reference to a point, area or volume indicated on a map, floor plan or building plan. In the description contained herein, the use of the term location may comprise any of these variants unless indicated otherwise.

In one example, navigation device 100 may communicate with a cellular communication network by transmitting wireless signals to, or receiving wireless signals from, a cellular transceiver 110 which may comprise a wireless base transceiver subsystem (BTS), a Node B or an evolved NodeB (eNodeB) over wireless communication link 123. Similarly, navigation device 100 may transmit wireless signals to, or receive wireless signals from local transceiver 115 over wireless communication link 125. A local transceiver 115 may comprise an access point (AP), femtocell, Home Base Station, small cell base station, Home Node B (HNB) or Home eNodeB (HeNB) and may provide access to a wireless local area network (WLAN, e.g., IEEE 802.11 network), a wireless personal area network (WPAN, e.g., Bluetooth® network) or a cellular network (e.g. an LTE network or other wireless wide area network such as those discussed in the next paragraph). Of course, these are merely examples of networks that may communicate with a navigation device 100 over a wireless link, and claimed subject matter is not limited in this respect.

Examples of network technologies that may support wireless communication link 123 are Global System for Mobile Communications (GSM), Code Division Multiple Access (CDMA), Wideband CDMA (WCDMA), Long Term Evolution LTE), High Rate Packet Data (HRPD), and 5G. GSM, WCDMA and LTE are technologies defined by 3GPP. CDMA and HRPD are technologies defined by the $3^{rd}$ Generation Partnership Project 2 (3GPP2). 5G is a technology defined by the $3^{rd}$ Generation Partnership Project (3GPP). WCDMA is also part of the Universal Mobile Telecommunications System (UMTS) and may be supported by an HNB. Cellular transceivers 110 may comprise deployments of equipment providing subscriber access to a wireless telecommunication network for a service (e.g., under a service contract). Here, a cellular transceiver 110 may perform functions of a cellular base station in servicing subscriber devices within a cell determined based, at least in part, on a range at which the cellular transceiver 110 is capable of providing access service. Examples of radio technologies that may support wireless communication link 125 are IEEE 802.11, Bluetooth (BT) and LTE.

In a particular implementation, cellular transceiver 110 and local transceiver 115 may communicate with servers 140 and/or 150 over a network 130 through links 145. Here, network 130 may comprise any combination of wired or wireless links and may include cellular transceiver 110 and/or local transceiver 115 and/or servers 140 and 150. In a particular implementation, network 130 may comprise Internet Protocol (IP) or other infrastructure capable of facilitating communication between navigation device 100 and servers 140 or 150 through local transceiver 115 or cellular transceiver 110. Network 130 may also facilitate communication between navigation device 100, servers 140 and/or 150 and a public safety answering point (PSAP) 160, for example through one or more additional communications links (not shown). In an implementation, network 130 may comprise cellular communication network infrastructure such as, for example, a base station controller or packet based or circuit-based switching center (not shown) to facilitate mobile cellular communication with navigation device 100. In a particular implementation, network 130 may comprise local area network (LAN) elements such as WLAN APs, routers and bridges and may in that case include or have links to gateway elements that provide access to wide area networks such as the Internet. In other implementations, network 130 may comprise a LAN and may or may not have access to a wide area network but may not provide any such access (if supported) to navigation device 100. In some implementations network 130 may comprise multiple networks (e.g., one or more wireless networks and/or the Internet). In one implementation, network 130 may include one or more serving gateways or Packet Data Network gateways. In addition, server 140 may be an E-SMLC, a Secure User Plane Location (SUPL) Location Platform (SLP), a SUPL Location Center (SLC), a SUPL Positioning Center (SPC), a Position Determining Entity (PDE) and/or a gateway mobile location center (GMLC), which may connect to one or more location retrieval functions (LRFs) and/or mobility management entities (MMEs) in network 130.

In particular implementations, and as discussed below, navigation device 100 may have circuitry and processing resources capable of obtaining location related measurements (e.g. for signals received from GPS or other Satellite Positioning System (SPS) satellites 114, cellular transceiver 110 or local transceiver 115 and capable of computing a position fix or estimated location of navigation device 100 based on these location related measurements. In some implementations, location related measurements obtained by navigation device 100 may be transferred to a location server such as an enhanced serving mobile location center (E-SMLC) or SUPL location platform (SLP) (e.g. which may be server 140) after which the location server may estimate or determine a location for navigation device 100 based on the measurements. In the presently illustrated example, location related measurements obtained by navigation device 100 may include measurements of signals (124) received from satellites belonging to an SPS or Global Navigation Satellite System (GNSS) such as GPS, GLONASS, Galileo or Beidou and/or may include measurements of signals (such as 123 and/or 125) received from terrestrial transmitters fixed at known locations (e.g., such as cellular transceiver 110 and/or local transceiver 115). Navigation device 100 or a separate location server may then obtain a location estimate for navigation device 100 based on these location related measurements using any one of several position methods such as, for example, GNSS, Assisted GNSS (A-GNSS), Advanced Forward Link Trilateration (AFLT), Observed Time Difference of Arrival (OTDOA) or Enhanced Cell ID (E-CID) or combinations thereof. In some of these techniques (e.g. A-GNSS, AFLT and OTDOA), pseudoranges or timing differences may be measured at navigation device 100 relative to three or more terrestrial transmitters fixed at known locations or relative to four or more satellites with accurately known orbital data, or combinations thereof, based at least in part, on pilots, positioning reference signals (PRS) or other positioning related signals transmitted by the transmitters or satellites and received at navigation device 100. Here, server 140 may be capable of providing positioning assistance data to navigation device 100 including, for example, information regarding signals to be measured (e.g., signal timing), locations and identities of terrestrial transmitters and/or signal, timing and orbital information for GNSS satellites to facilitate positioning techniques such as A-GNSS, AFLT, OTDOA and E-CID. For example, server 140 may comprise an almanac which indicates locations and identities of cellular transceivers and/or local transceivers in a particular region or regions such as a particular venue, and may provide information descriptive of signals transmitted by a cellular base station or AP such as transmission power and signal timing. In the case of E-CID, a navigation device 100 may obtain measurements of signal strengths for signals received from cellular transceiver 110 and/or local transceiver 115 and/or may obtain a round trip signal propagation time (RTT) between navigation device 100 and a cellular transceiver 110 or local transceiver 115. A navigation device 100 may use these measurements together with assistance data (e.g. terrestrial almanac data or GNSS satellite data such as GNSS Almanac and/or GNSS Ephemeris information) received from server 140 to determine a location for navigation device 100 or may transfer the measurements to a server 140 to perform the same determination.

In one implementation, server 150 is a route management server that is connected to a route database 155. Route management server 150 is configured to receive a starting location, a destination location, and a request for a route between the starting location and the destination location. For example, a navigation device 100 may transmit the starting and destination locations along with the request for a route between the two locations to route management server 150. In response to the request, route management server 150 may request data from route database 155 to determine one or more routes between the starting and destination locations. Route management server 150 may determine one or more suggested routes based on one or more route selection priorities. Route management server 150 transmits the one or more suggested routes to navigation device 100 to enable navigation device 100 to display the suggested routes to the user of navigation device. In an alternative implementation, route management server 150 transmits data representative of the routes, roads, road segments, and/or lanes to navigation device 100. Navigation device 100 then determines one or more suggested routes from the starting location to the destination location based on one or more route selection priorities and displays the suggested routes to the user.

Each route includes one or more segments of a road (or other avenue of transportation) between the starting location and the destination location. Each road may be viewed as a combination of one or more segments (sometimes referred to as "road segments"), and each road segment may be defined as a stretch of the road between successive entrances and/or exits of the road. For example, a road segment of a highway may be defined as the stretch of the highway between two successive exits from the highway. As another example, a road segment in an urban setting may be defined as the stretch of the road between a first intersection and a second intersection. Each road (and each road segment) may include one or more lanes in which vehicles may travel. In some embodiments, some roads and/or lanes may be adjacent to the primary roadways traveled by vehicles, such as one or more lanes provided in a pull-out or diversion of a road or freeway, a rest stop, a pit stop, a weigh station, an on-ramp or off-ramp, etc. For roads that do not include formal lanes (e.g., an undivided rural road), the entire width of the road or half the width of the road may be considered a lane. While the foregoing implementation has been described with respect to routes including various road segments, it should be recognized that the implementations and lanes described herein may be based on other avenues of transportation, such as bicycle lanes, pedestrian walkways, bus lanes, train tracks, trolley lines, etc.

In some aspects, route database 155 stores a plurality of records of the roads, road segments, and lanes for a geographic area, as well as charging lane information representing a charging capability for each lane. As used herein, the charging capability for a lane refers to a capability of that lane to provide charging power to one or more batteries of an electric vehicle (EV) travelling in that lane. In some aspects, route database 155 may store the charging capability of each road and/or road segment in addition to, or in place of, the charging capability of each lane.

While FIG. 1 illustrates a single route database and route management server, it should be recognized that a plurality of route management servers and/or route databases may be provided in some implementations. For example, a plurality of route databases and/or route management servers may be provided that each includes data for the routes, roads, road segments, and lanes in a particular geographic area. When a navigation device requests a route to a destination, the request may be routed to the route management server and route database corresponding to the geographical location of the starting location and/or the destination location of the requested route. In addition, other servers, such as a crowd-source server (not shown) may be included to facilitate receiving and synthesizing crowd-sourced data from multiple navigation devices 100 and providing the data to route management server 150 in some aspects.

Figure 2:
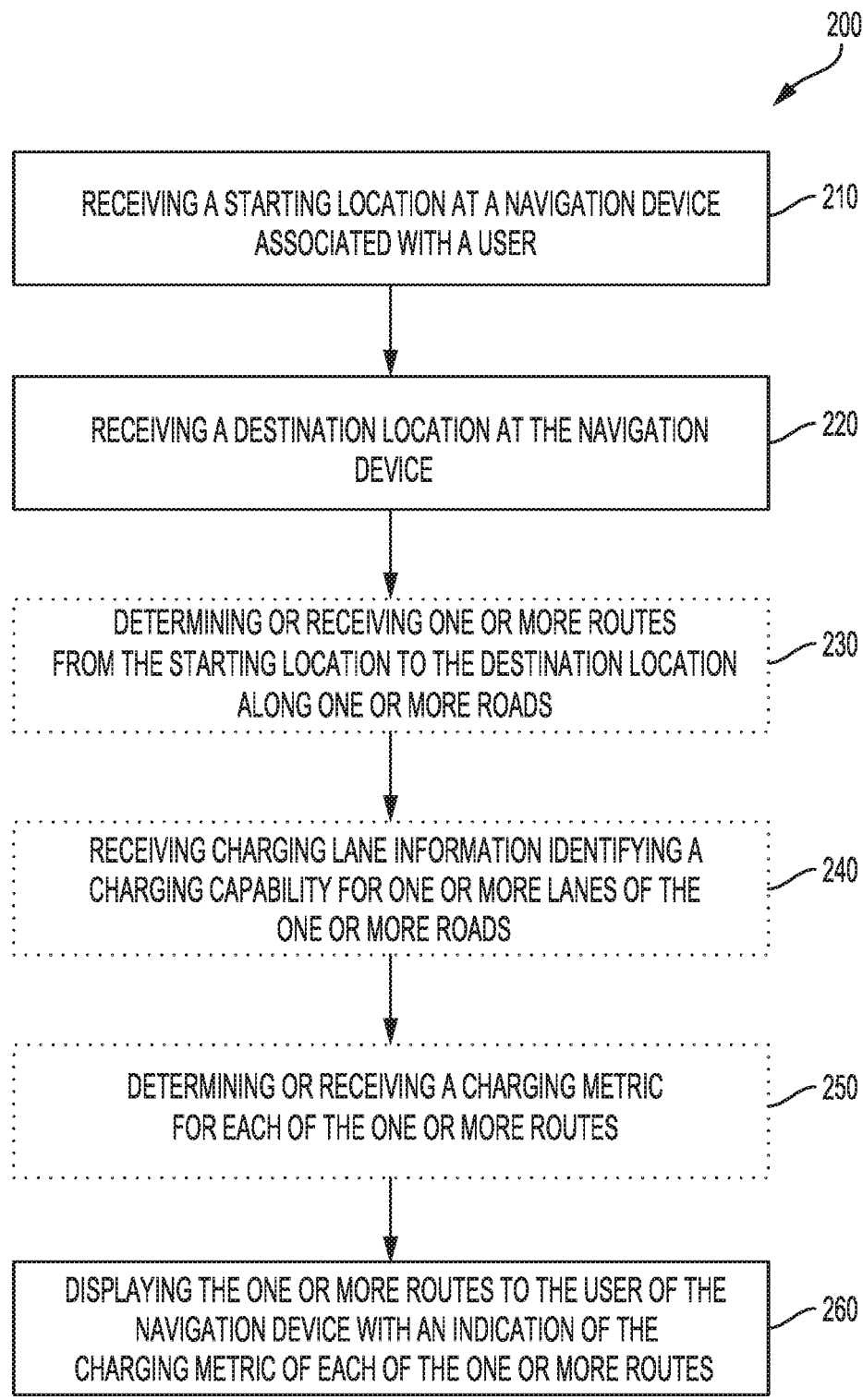
FIG. 2 is a flow diagram illustrating a method of providing one or more routes to a destination.

FIG. 2 is a flow diagram 200 illustrating an example method 200 of providing a route to a destination location for a navigation device 100. In the implementation described in FIG. 2, the steps of method 200 may be implemented by a navigation device 100, such as by executing instructions stored within a memory of navigation device 100 using a processor of navigation device 100. Accordingly, navigation device 100, including a processor, memory, and display of navigation device 100, may constitute means for performing each function and block of method 200.

At block 210, method 200 includes receiving a starting location at a navigation device 100 associated with a user. In one aspect, navigation device 100 receives the starting location when the user of navigation device 100 enters the starting location using a user interface of navigation device 100. For example, the user may select an option to use the current location of the user as the starting location, or may select a location on a map displayed on a display of navigation device 100. As another example, the user may select a starting location from a list of previously entered or stored locations. In another aspect, navigation device 100 may receive the starting location from another device in communication with navigation device 100. Navigation device 100 receives the selected starting location and may store the starting location in memory. Accordingly, a processor, a user interface, and/or a wireless transceiver of navigation device 100 may constitute means for receiving a starting location at a navigation device associated with a user.

At block 220, method 200 includes receiving a destination location at the navigation device 100. In one aspect, navigation device 100 receives the destination location when the user of navigation device 100 enters the destination location using a user interface of navigation device 100. For example, the user may select a location on a map displayed on a display of navigation device 100. As another example, the user may select a destination location from a list of previously entered or stored locations. In another aspect, navigation device 100 may receive the starting location from another device in communication with navigation device 100. Navigation device 100 receives the selected destination location and may store the starting location in memory. A user may then select a button or selectable area of the user interface to request a route between the starting location and the destination location. In response to the selection of the route request, navigation device 100 may transmit the starting location, the destination location, and the request for the route between the two locations to route management server 150. Accordingly, a processor, a user interface, and/or a wireless transceiver of navigation device 100 may constitute means for receiving a destination location at a navigation device.

At block 230, method 200 optionally includes determining or receiving one or more routes from the starting location to the destination location along one or more roads. For example, in response to the request and the starting and destination locations, route management server 150 may transmit one or more suggested routes between the starting location and the destination to navigation device 100. Route management server 150 may also transmit updated map information to navigation device 100 to ensure that navigation device 100 has the most current map data and to ensure that the one or more routes transmitted from route management server 150 correspond to the map data presented by navigation device 100. Alternatively, a processor of navigation device 100 may determine one or more suggested routes and may provide the routes in preparation for displaying the routes to the user. Accordingly, a processor and a wireless transceiver of navigation device 100 may constitute means for receiving, determining, or providing one or more routes from the starting location to the destination location.

At block 240, method 200 optionally includes receiving charging lane information identifying a charging capability for one or more lanes of the one or more roads of each route provided in block 230. For example, further in response to the request and the starting and destination locations, route management server 150 may transmit charging lane information indicating a charging capability of each lane within each road segment of each road for each of the one or more routes to navigation device 100. In one embodiment, if charging lane information is not available for one or more lanes, road segments, roads, and/or routes, route management server 150 and/or navigation device 100 may assume that no charging capability is present and may treat the lanes, road segments, roads, and/or routes as not having charging capability. Accordingly, in one implementation, route management server 150 may only transmit the charging lane information for the lanes, road segments, roads, and/or routes that route management server 150 determines to have charging capability. Accordingly, a processor and wireless transceiver of navigation device 100 may constitute means for receiving, determining, or providing charging lane information identifying a charging capability for one or more lanes of the one or more roads.

At block 250, method 200 optionally includes determining or receiving a charging metric for each of the one or more routes. The charging metric for each route can include, for example, a percentage of the distance along the route that has charging capability in one or more of the lanes, an amount of charging power available along each route, an expected level of charge of a battery (referred to herein as a "battery charge level") that the user's vehicle will have at the end of the route, a charging profile of the route (i.e., how much of the charging capability is present at the beginning of the route vs. the end of the route), or any combination thereof. Accordingly, a processor and a wireless transceiver of navigation device 100 may constitute means for receiving, determining, or providing a charging metric for one or more routes from the starting location to the destination location.

Navigation device 100 may determine the charging metric based on the charging lane information received from route management server 150 and/or based on information stored within navigation device 100 or received from another device. For example, navigation device 100 may receive a present battery charge level and an average or historical battery consumption rate of the user's vehicle from a battery controller or another suitable device or system associated with the vehicle. Navigation device 100 may then determine the expected battery charge level that the user's vehicle will have at the end of each route based on the present charge level of the vehicle's battery, the average or historical battery consumption rate, the distance of the route, and the charging lane information for the route. In some aspects, navigation device 100 may transmit this data to route management server 150 or to another server (e.g., a crowd-source server) to assist the server in planning routes for multiple electric vehicles.

At block 260, method includes displaying the one or more routes to the user of navigation device 100 with an indication of the charging metric of each of the one or more routes. For example, navigation device 100 may display an image of a map of the geographical area encompassing the starting location and the destination location and may display the one or more routes within the map image. In one aspect, navigation device 100 may display the charging metric and/or charging availability of each route by highlighting each route that includes charging capability or by displaying the route using a color that is different than a color used to display the routes that do not have charging capability and/or availability. In a more specific aspect, navigation device 100 may display only the portions of each route (e.g., the roads, road segments, and/or lanes) that include charging capability and/or charging availability by highlighting the portions or by displaying the portions in a different color than the portions or routes that do not include charging capability and/or charging availability. Accordingly, a display and a processor of navigation device 100 may constitute means for displaying one or more routes from the starting location to the destination location with an indication of a charging metric of each of the one or more routes.

In an aspect in which the charging metric includes a percentage of the route that includes charging capability (i.e., a percentage of the route that is charging capable), navigation device 100 may display each route along with the percentage value for that route. In an aspect in which the charging metric includes an amount of charging power available along each route, navigation device 100 may display a color gradient, an intensity level, a textual display, or the like, to indicate the amount of charging power available for each lane, road segment, road, and/or route. In an aspect in which the charging metric includes an expected battery charge level that the user's vehicle will have at the end of the route, navigation device 100 may display the route and a textual display or graphical display of the percentage value of the expected battery charge level that the vehicle associated with navigation device 100 will have at the end of the route. In an aspect in which the charging metric includes a charging profile (i.e., how much of the charging capability is present at the beginning of the route vs. the end of the route) of the route, navigation device 100 may display the route along with a graphical representation or textual representation of the charging capability at the various portions of the route. It should be recognized that these aspects are merely examples for illustration purposes, and any aspects for displaying the charging metric may be used alone or together for any of the routes.

In one aspect, navigation device 100 and/or route management server 150 may create a filtered list of routes that only include the route or routes that include one or more lanes having charging capability. For example, navigation device 100 and/or route management server 150 may determine that navigation device 100 is associated with a vehicle capable of being charged (i.e., an EV). Alternatively, the user may enter an input into navigation device 100 that indicates the user wishes to only view routes that have charging capability. In response to the determination or the input, navigation device 100 and/or route management server 150 may create the filtered list that only includes routes with charging capability in one or more lanes. Navigation device 100 may then display the filtered list of routes to the user.

In another aspect, navigation device 100 may determine and present a ranked list of the routes to the user. The ranked list may be presented in order of the route associated with the highest charging metric to the route associated with the lowest charging metric. For example, if the charging metric includes a percentage of the distance of each route that includes charging capability, the ranked list may start with the route having the highest percentage and may present each other route in decreasing order of percentage. As another example, if the charging metric includes an expected battery charge level of the user's vehicle at the end of the route, the ranked list may start with the route having the highest expected battery charge level and may present each other route in decreasing order of expected battery charge level.

In another aspect, route management server 150 may determine a group of possible routes between the starting location and the destination location and may select a set of suggested routes from the possible routes to transmit to navigation device 100. The set of suggested routes may include a first route that has a shortest expected time of arrival at the destination location, a second route that has a shortest distance to the destination location, and a third route that has a highest charging metric. In another aspect, the suggested routes may be based on balancing or considering a combination of factors, such as both the charging metric and the estimated time of arrival, the charging metric and the distance, or all the factors in combination.

In one aspect, navigation device 100 and/or route management server 150 may determine an expected cost of travelling each of the one or more routes based on the charging metric (also referred to as the "commuting cost"). For example, navigation device 100 may receive an average or expected number of miles per charge of the vehicle associated with navigation device 100 from a memory of navigation device 100 or from another device associated with the vehicle. Navigation device 100 may also receive an average or expected cost per charge of the vehicle associated with navigation device 100 from a memory of navigation device 100 or from another device associated with the vehicle. Navigation device 100 may use the average or expected number of miles per charge, the number of miles of a route being considered, and the average or expected cost per charge to calculate the total expected cost of travelling each of the one or more routes. In the case of a hybrid electric vehicle, navigation device 100 may use the above calculation to determine the cost of travelling on battery power and may supplement the cost of travelling with any cost associated with travelling on gasoline power. To determine the cost of travelling on gasoline power, the navigation device 100 may receive the average or expected miles per gallon of the vehicle, the number of miles for the route being considered (or the number of miles after the hybrid electric vehicle is expected to run out of battery charge and will have to switch to gas-powered operation), and the average or expected cost per gallon of gasoline to determine the cost of travelling the route. Other cost data may be included as well, such as the cost of any toll roads, etc., along each route. Navigation device 100 may use the expected cost of travelling each route to suggest the cheapest route to the user. Alternatively, navigation device 100 may use the expected cost of travelling each route to present an ordered or filtered list to the user which ranks the routes in order from cheapest to most expensive and/or to filter out routes having an expected cost that is higher than a user-defined threshold. Alternatively, route management server 150 may receive any of the above data from navigation device 100 (or another suitable device associated with the vehicle) and may determine the expected cost of each route and/or may suggest the routes to the user based on the expected costs.

In one aspect, navigation device 100 may supplement partial or missing data regarding charging capability along one or more routes. For example, navigation device 100 may detect charging capability (or lack thereof) along each portion of a route travelled by navigation device 100. During this detection process, navigation device 100 may detect charging capability for a lane that is not included in the charging lane information received from route management server 150. Alternatively, the vehicle associated with navigation device 100 may detect the charging capability of the lane vehicle travels along and may transmit the charging capability to navigation device 100. In turn, navigation device 100 may transmit the charging capability data to route management server 150, and route management server 150 may store the charging capability data in route database 155. In addition to the charging capability data, navigation device 100 may gather and transmit to route management server 150 a battery status of the vehicle associated with navigation device 100, a charge level of the vehicle's battery, a speed of the vehicle, a location of the vehicle, an orientation or heading of the vehicle, and/or any other suitable data. Route management server 150 may use the received data to supplement existing route data and the charging capability for each route, road, and/or road segment. Route management server 150 may also receive similar data from other vehicles and/or navigation devices and may store the data in route database 155 for use in planning and suggesting routes for multiple vehicles.

In one aspect, route management server 150 may determine an amount of congestion (i.e., traffic) for each route, road, road segment, and lane based on the data received from the vehicles and/or navigation devices. For example, route management server 150 may receive the position, orientation, and speed of each vehicle travelling in each route, road, road segment, and/or lane, and may determine an amount of congestion for each route, road, road segment, and/or lane accordingly. Route management server 150 may transmit congestion information to each navigation device, including navigation device 100. Navigation device 100 may receive the congestion information and may include the information in the charging metric described above. For example, navigation device 100 may determine that one or more lanes having charging capability are too congested to allow the vehicle associated with navigation device 100 to reach its destination location in an acceptable amount of time (i.e., the charging lane is effectively unavailable), or may factor the congestion information into the suggestion or ranking. Accordingly, navigation device 100 may suggest a different route that may include a lesser amount of charging capability but that may enable the vehicle to reach the destination location in a shorter time based on the congestion information. The congestion information may be displayed as part of the charging metric as an indication of the availability or "charging occupancy" of the charging lanes within each route. For example, the congestion information or charging occupancy of each lane with charging capability may be displayed as a gradient with a lighter shading or color representing more charging lane availability (less occupancy) and with a darker shading or color representing less charging lane availability (more occupancy). These examples are merely illustrative, and it should be recognized that the congestion information may be displayed as part of the charging metric in any suitable manner.

In one aspect, the congestion information may be used to determine a suggested time of departure and/or speed at which to drive to the destination. For example, navigation device 100 or route management server 150 may determine that a particular charging lane is currently unavailable but is expected to become available in 10 minutes. Accordingly, navigation device 100 and/or route management server 150 may suggest a departure time of 10 minutes from a current time to enable the vehicle to take advantage of the charging lane. The suggested time of departure may also take into account a current battery charge level of the vehicle such that the vehicle is expected to have enough battery charge to reach one or more available charging lanes. Similarly, if the vehicle is currently driving along a portion of the route, navigation device 100 and/or route management server 150 may suggest an adjustment to the speed of the vehicle (i.e., to drive slower or faster) to enable the vehicle to reach a next portion of the route having charging lane capability at a time when the charging lane also has availability.

In one implementation, the congestion information may include crowd-sourced information from different groups of vehicles travelling on different lanes of the same road. For example, the congestion information may include first usage information that is derived from crowd-sourced data received from a first group of vehicles that are travelling in a first lane that has charging capability and second usage information that is derived from crowd-sourced data received from a second group of vehicles that are travelling in a second lane that does not have charging capability. In one aspect, the first group of vehicles are capable of being charged and the second group of vehicles are not capable of being charged (i.e., are vehicles that do not have an electrically chargeable battery). Thus, route management server 150 may determine the congestion of each lane separately within each road and may provide suggested routes and lanes appropriate to each vehicle type (e.g., electric vehicles, conventional combustion vehicles, etc.).

Route management server 150 may also determine the projected charging lane availability based on route information transmitted to route management server from a plurality of cars (e.g., from the first group of vehicles described above). Route management server 150 may determine a suggested departure time, speed, and/or route using the projected charging lane availability to enable the vehicle to travel along a route that enables the charging metric to be achieved. Additionally or alternatively, route management server 150 may transmit the projected charging lane availability to navigation device 100 to enable navigation device 100 to determine a suggested departure time, speed, and/or route using the projected charging lane availability to enable the vehicle to travel along a route that enables the charging metric to be achieved.

Route management server 150 may also update the charging lane availability and/or the projected charging lane availability in real-time based on the data received from vehicles and/or navigation devices 100 in communication with route management server 150 and/or based on the congestion information. Route management server 150 may also receive the battery charge level and the battery charging status of each vehicle from each vehicle's associated navigation device 100. Route management server 150 may transmit updated suggested routes and/or speeds for the vehicles based on the updated charging lane availability, the projected charging lane availability, the congestion information, the battery charge level of the vehicle, and/or the battery charging status of the vehicle. Navigation device 100 may receive the updated route and/or speed and may display a prompt to the user to accept or reject the updated route and/or speed. In this manner, route management server 150 and navigation device 100 may dynamically adjust the route and/or speed to achieve the desired charging metric.

While the above-described implementations may rely at least partially on information received from one or more servers (e.g., route management server 150), it should be recognized that method 200 may alternatively be performed in a standalone mode in which navigation device 100 does not rely on information from a server. For example, in some implementations, navigation device 100 may be a standalone device that determines or obtains the routes from the starting location to the destination location using map data stored in a memory of navigation device 100. In addition, navigation device 100 may receive charging lane information from a memory of navigation device 100 and may determine the charging metric for each route based on the stored data. Navigation device 100 may also perform each other function of route management server 150 and/or route database 155 in certain implementations.

Figure 3:
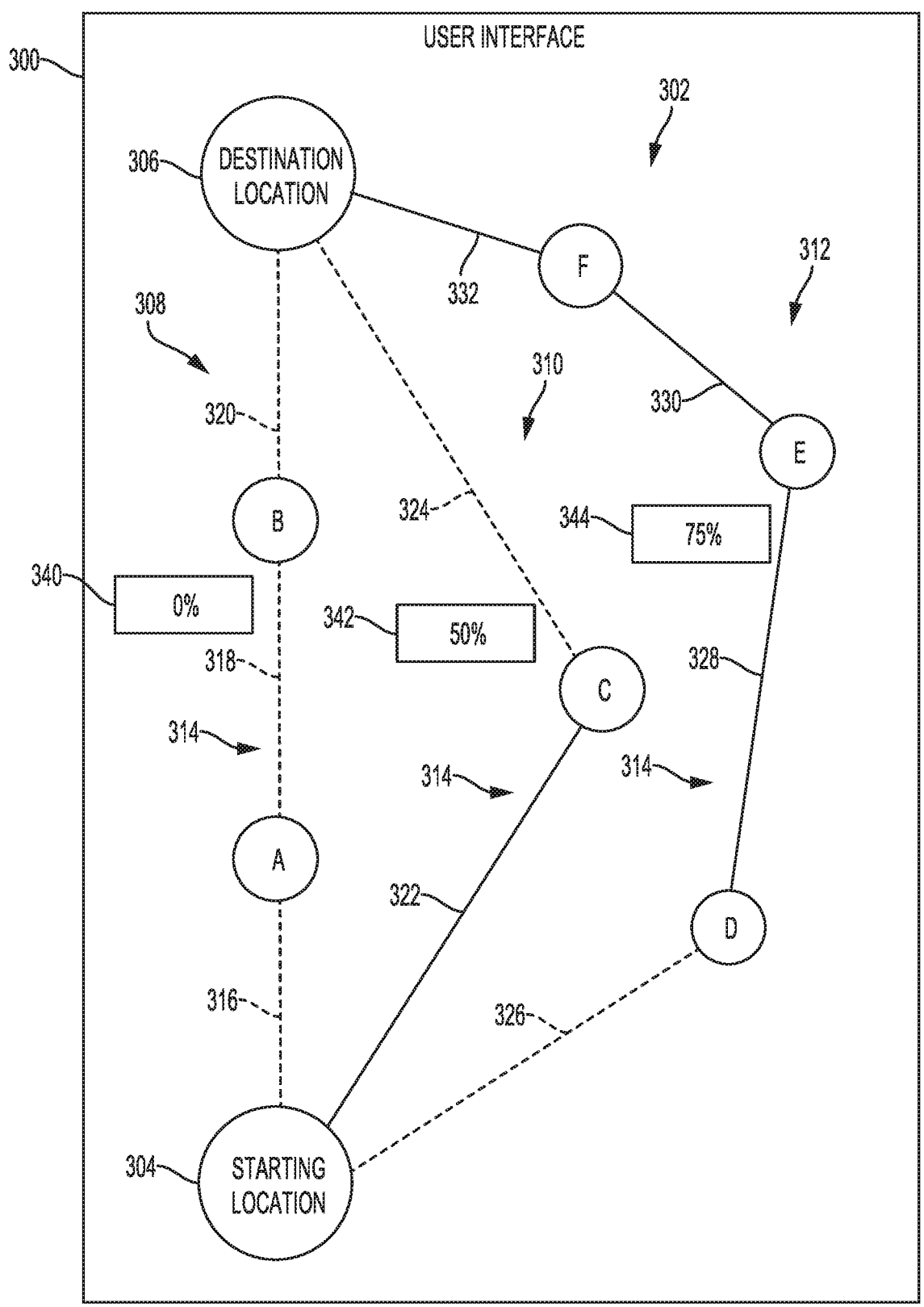
FIG. 3 is a block diagram of an example user interface that may display multiple routes to a user using the system shown in FIG. 1.

FIG. 3 is a block diagram of a user interface 300 that may display multiple routes 302 to a user using navigation device 100. In the example shown in FIG. 3, dashed lines represent route segments with no charging capability while solid lines represent route segments with charging capability (i.e., at least one lane having charging capability). In an aspect, user interface 300 is implemented within a display integrated with navigation device 100 or a display that is communicatively coupled to navigation device 100. The operation of user interface 300 may be provided by the processor of navigation device 100 executing computer-readable instructions stored within a memory of navigation device 100. Accordingly, navigation device 100, including the processor, memory, and display, may constitute means for performing the functionality described herein with respect to FIG. 3.

As shown in FIG. 3, a plurality of routes 302 between a starting location 304 and a destination location 306 may be displayed to a user using navigation device 100. For example, in response to the user selecting starting location 304 and destination location 306 and optionally inputting a request for a route, navigation device 100 may display a plurality of routes 302 on a display of navigation device 100 (or a display in communication with navigation device 100). In the example shown in FIG. 3, a first route 308, a second route 310, and a third route 312 are displayed to the user. However, it should be recognized that any suitable number of routes may be displayed to the user. First route 308 extends from starting location 304 through points A and B to destination location 306. Second route 310 extends from starting location 304 through point C to destination location 306. Third route 312 extends from starting location 304 through points D, E, and F to destination location 306.

As illustrated, each route 302 may include one or more route segments 314. Route segments 314 correspond to one or more roads or road segments described above with reference to FIG. 2. Each route segment 314 may be designated as being charging capable (i.e., having charging capability) or as not being charging capable (i.e., not having charging capability). A route segment 314 is charging capable if one or more lanes of a road or road segment within the route segment 314 is charging capable. Conversely, a route segment 314 is not charging capable if every lane within the road or road segment within the route segment 314 is not charging capable.

Accordingly, in the example shown in FIG. 3, first route 308 includes a first route segment 316 (between starting location 304 and point A), a second route segment 318 (between points A and B), and a third route segment 320 (between point B and destination location 306), each of which is not charging capable. Second route 310 includes a fourth route segment 322 (between starting location 304 and point C) that is charging capable and a fifth route segment 324 (between point C and destination location 306) that is not charging capable. Third route 312 includes a sixth route segment 326 (between starting location 304 and point D) that is not charging capable and a seventh route segment 328 (between points D and E), an eighth route segment 330 (between points E and F), and a ninth route segment 332 (between point F and destination location 306) that are each charging capable. It should be recognized that these examples are merely illustrative and should not be viewed as limiting the scope of the disclosure.

Navigation device 100 may prioritize or rank the routes according to the charging metric and/or based on vehicle information described above. For example, even though first route 308 is shorter in distance than second route 310 and third route 312, navigation device 100 may prioritize or rank second route 310 and third route 312 higher than first route 308 since second route 310 and third route 312 have charging capability for at least a portion of their respective route. As a further example, in one aspect, navigation device 100 may rank third route 312 highest since it includes the largest percentage of distance along the route that has charging capability. However, if navigation device 100 determines that the battery level of the vehicle associated with navigation device is below a threshold (e.g., 10%), navigation device 100 may prioritize second route 310 higher than third route 312 since second route 310 includes charging capability in the initial route segment. As a result, the vehicle has less of a chance of running out of battery charge while driving along second route 310 as compared to third route 312. As another example, if navigation device 100 prioritizes preserving a highest amount of battery charge by the time the vehicle reaches destination location 306, navigation device 100 may prioritize third route 312 above second route 310 since third route 312 concludes with multiple route segments 314 having charging capability. The above examples are merely illustrative, and it should be recognized that navigation device 100 may rank or prioritize the plurality of routes based on any other charging metric, vehicle information, or combinations thereof. Navigation device 100 may then display or otherwise present the routes to the user based on the ranking or prioritization described herein.

In some aspects, user interface 300 may display a charging metric associated with each route 302 as described above with reference to FIG. 2. In the example shown in FIG. 3, a first charging metric 340 associated with first route 308, a second charging metric 342 associated with second route 310, and a third charging metric 344 associated with third route 312 are displayed within user interface 300. In the example shown in FIG. 3, the charging metric includes a percentage of the distance along each route that has charging capability. Accordingly, first route 308 does not have any charging capability so first charging metric is displayed as 0%. Second route 310 includes charging capability for the first half of the route (i.e., fourth route segment 322) but no charging capability for the second half of the route (i.e., fifth route segment 324). Thus, second charging metric 342 is displayed as 50%. Third route 312 has no charging capability for the first route segment (i.e., sixth route segment 326) but has charging capability for the remaining three route segments (i.e., seventh route segment 328, eighth route segment 330, and ninth route segment 332). Accordingly, third charging metric 344 is displayed as 75%. It should be recognized that the lengths of each route segment are not drawn to scale and are thus displayed for illustration purposes only. In addition, while the charging metrics displayed in FIG. 3 relate to the percentage amount of each route 302 that has charging capability, it should be recognized that any suitable charging metric or metrics may be displayed for each route.

Figure 4:
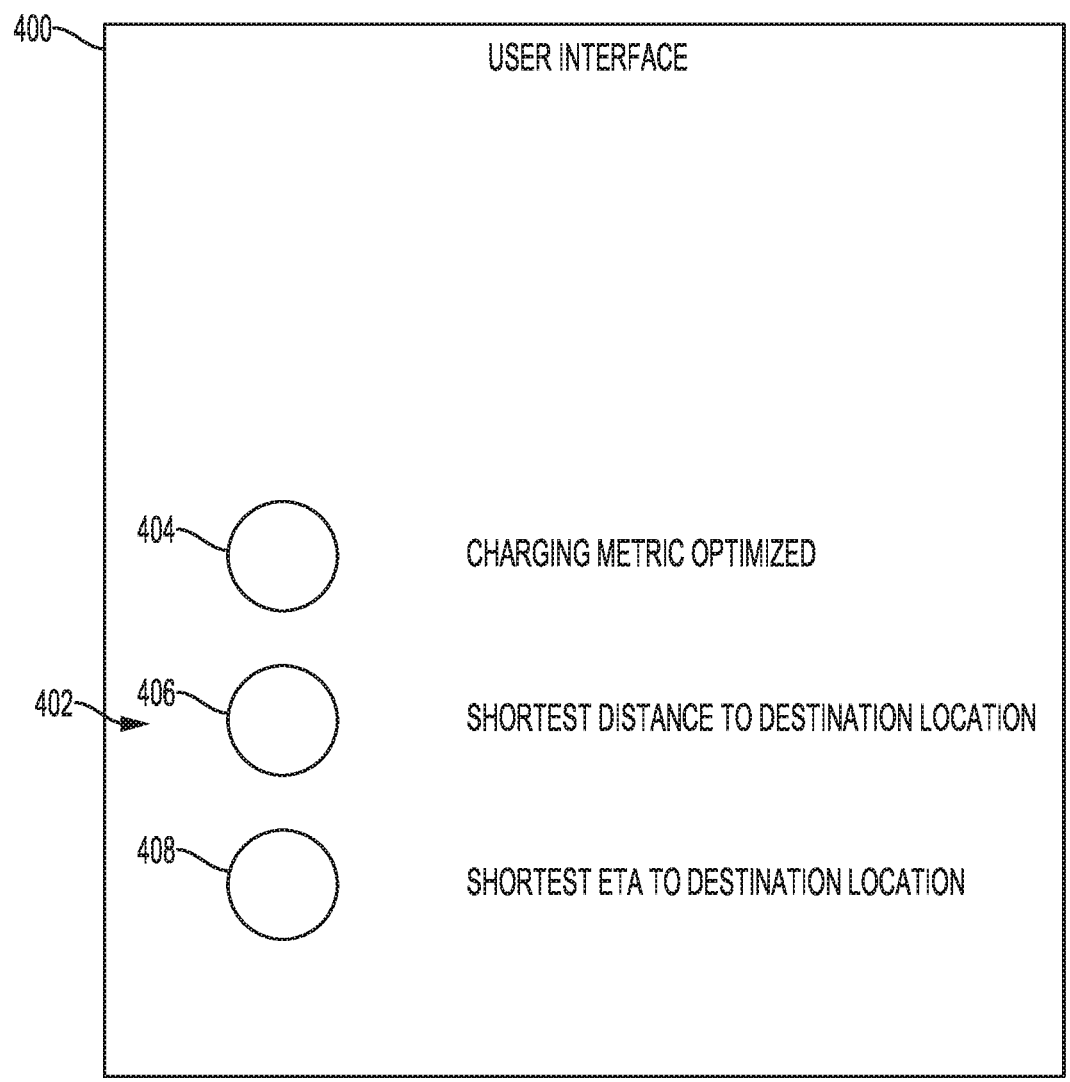
FIG. 4 is a block diagram of an example user interface for selecting one or more route selection priorities that may be used with the system shown in FIG. 1.

FIG. 4 is a block diagram of an example user interface 400 that may be displayed to a user. User interface 400 may be displayed on a display integrated with navigation device 100 or may be displayed on a display of a device or system that is communicatively coupled to navigation device 100. The operation of user interface 400 may be provided by the processor of navigation device 100 executing computer-readable instructions stored within a memory of navigation device 100. Accordingly, navigation device 100, including the processor, memory, and display, may constitute means for performing the functionality described herein with respect to FIG. 4.

In the example shown in FIG. 4, user interface 400 presents a plurality of route selection priorities 402 to the user to enable the user to select which factor(s) to prioritize when ranking the plurality of routes and when suggesting which route or routes that the user should take.

In one aspect, the user may select a "charging metric optimized" button or selector 404 to cause navigation device 100 to prioritize routes that have a highest charging metric. For example, in response to an input from the user selecting the charging metric optimized selector 404, navigation device 100 may filter the routes to only display routes that include charging capability for at least one route segment and/or may present a list of routes that are ordered from highest charging metric to lowest charging metric.

In another aspect, the user may select a "shortest distance to destination location" button or selector 406 (referred to herein as the "shortest distance selector") to cause navigation device 100 to prioritize routes that have a shortest distance from the starting location to the destination location. For example, in response to an input from the user selecting the shortest distance selector 406, navigation device 100 may present a list of routes that are ordered from the shortest distance to the destination location to the longest distance to the destination location.

In another aspect, the user may select a "shortest ETA to destination location" button or selector 408 (referred to herein as the "shortest ETA selector") to cause navigation device 100 to prioritize routes that have a shortest estimated time of arrival (ETA) from the starting location to the destination location. For example, in response to an input from the user selecting the shortest ETA selector 408, navigation device 100 may present a list of routes that are ordered from the shortest ETA to the destination location to the longest ETA to the destination location.

It should be recognized that the above examples are merely illustrative and that other factors may be provided to the user for selection as desired. In addition, each of the factors may be combined with one or more other factors in some aspects. For example, the charging metric optimized factor may be combined with the shortest ETA to destination location factor such that when the user selects the charging metric optimized selector, navigation device 100 first orders the routes based on the highest charging metric and secondarily orders the routes based on the shortest ETA to the destination location. Other suitable combinations of two or more of the factors may be implemented as well in other aspects.

In addition, while a radio button is displayed in FIG. 4 to represent the input selection mechanism of the user, it should be recognized that any suitable selection mechanism may be used. For example, in one embodiment, a prompt may be displayed to the user to enable the user to select the desired factor or factors. In an alternative implementation, one or more suggested routes may be displayed that correspond to each factor and the user may select one of the suggested routes to use. For example, one or more routes may be suggested by navigation device 100 (or by route management server 150) that correspond to the highest charging metric, one or more routes may be suggested for the shortest ETA to the destination location, and one or more routes may be suggested for the shortest distance to the destination location. The user may then select which route to use from among the set of suggested routes. In a further aspect, the routes corresponding to each of the different factors may be displayed in a different color (or in another suitable distinguishing fashion) from the routes corresponding to the other factors. As an example, the one or more routes corresponding to the highest charging metric may be displayed in a green color, the one or more routes corresponding to the shortest ETA to the destination location may be displayed in a blue color, and the one or more routes corresponding to the shortest distance to the destination location may be displayed in an orange color. These colors and display mechanisms are merely illustrative, and any suitable color or display mechanism may be used to distinguish the routes from each other.

Figure 5:
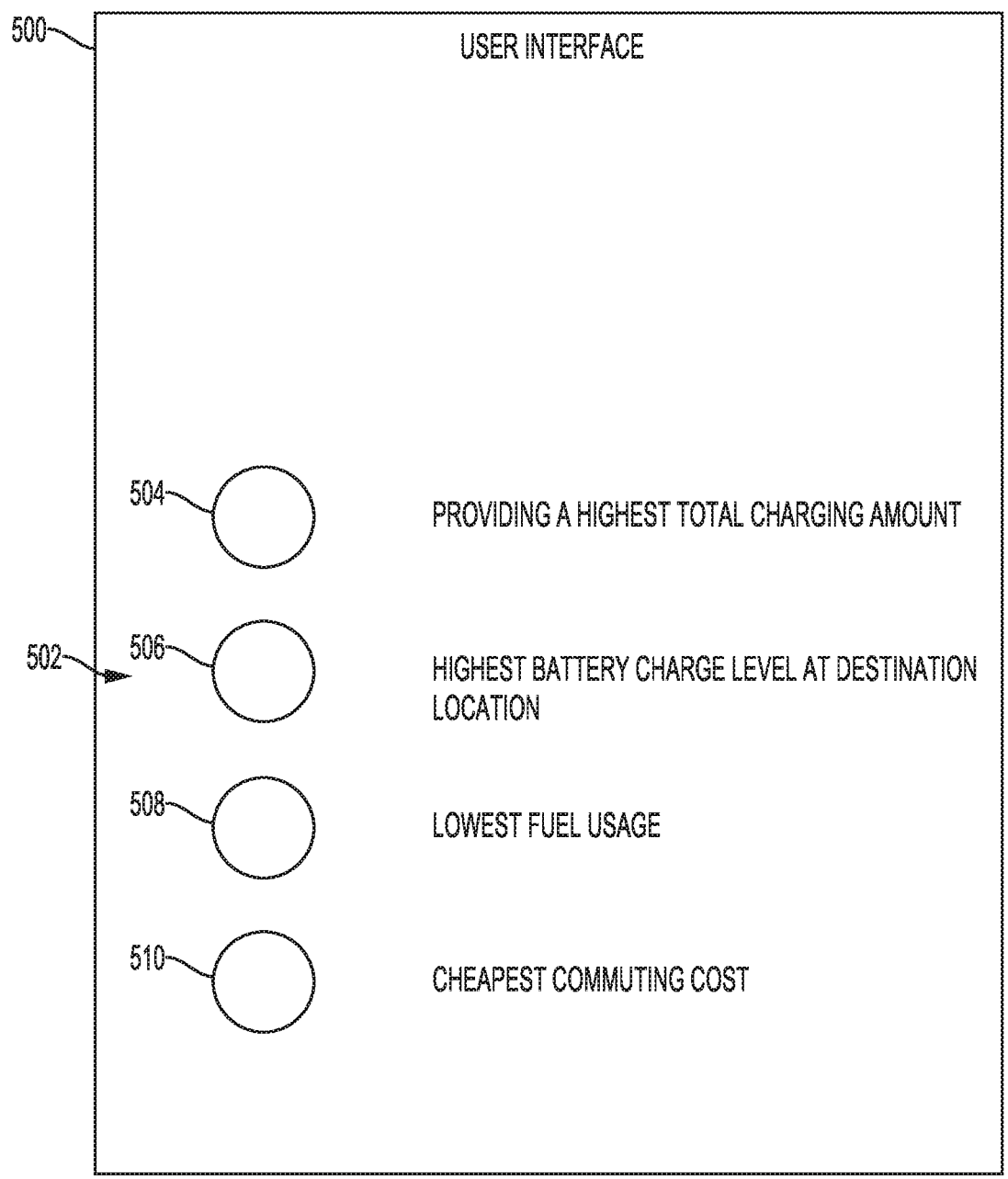
FIG. 5 is a block diagram of another example user interface for selecting one or more charging metric priorities that may be used with the system shown in FIG. 1.

FIG. 5 is a block diagram of an example user interface 500 that may be displayed to a user. User interface 500 may be displayed on a display integrated with navigation device 100 or may be displayed on a display of a device or system that is communicatively coupled to navigation device 100. The operation of user interface 500 may be provided by the processor of navigation device 100 executing computer-readable instructions stored within a memory of navigation device 100. Accordingly, navigation device 100, including the processor, memory, and display, may constitute means for performing the functionality described herein with respect to FIG. 5.

In the example shown in FIG. 5, user interface 500 presents a plurality of charging metric priorities 502 that a user may select to enable navigation device 100 or route management server 150 to use when selecting a route from a starting location to a destination location. In one aspect, the charging metric priorities 502 may include providing a highest total charging amount 504 to the vehicle associated with navigation device 100, a highest battery charge level 506 at the destination location, a lowest fuel usage 508, and a cheapest commuting cost 510.

In one aspect, if the user selects the charging metric priority 502 of providing a highest total charging amount 504 to the vehicle associated with navigation device 100, navigation device 100 or route management server 150 may prioritize the route or routes that have the highest percentage of distance along the route that have charging capability. In some aspects, navigation device 100 or route management server 150 may factor in an amount of charging power provided by one or more lanes along each route when determining the total amount of charging available to the vehicle along the route. Additionally or alternatively, navigation device 100 or route management server 150 may determine whether one or more charging lanes are actually available or are expected to be available along each route based on the congestion information received for each route and/or lane. For example, if navigation device 100 or route management server 150 determines that a particular charging lane is at full capacity such that the vehicle associated with navigation device 100 will not be able to travel in that lane, navigation device 100 or route management server 150 may equate the charging capability for that lane as being effectively zero when determining the charging capability of the route including that lane. In an alternative aspect, a separate charging metric priority 502 may be provided to enable the user to prioritize charging lanes that are available (i.e., that have charging lane availability as described above).

If the user selects the charging metric priority 502 of providing a highest battery charge level 506 at the destination location, navigation device 100 or route management server 150 may prioritize the route or routes that are expected to cause the battery of the vehicle associated with the navigation device 100 to have the highest level of charge at the end of the route. For example, if a first route has a route segment that does not have charging capability right before the end of the route, a second route that does have charging capability at the end of the route may be prioritized above the first route. This may be the case even if the first route has more overall charging capability than the second route as long as the second route is expected to leave the vehicle battery at a higher charge level at the end of the route.

In another example, navigation device 100 or route management server 150 may suggest a speed at which to drive the vehicle to achieve a desired battery charge level 506 at the destination location or to otherwise achieve a desired charging metric. Navigation device 100 or route management server 150 may determine the suggested speed based on a historical or modeled driving efficiency curve that identifies a miles per gallon equivalent (mpge) or other metric associated with a driving efficiency of the vehicle at various speeds. The suggested speed may also be determined based on a charging level of the vehicle and/or a distance to a next available charging lane to ensure that the vehicle will have enough charge to reach the destination and/or the charging lane.

If the user operates a hybrid electric vehicle (HEV) associated with navigation device 100, the user may select the charging metric priority 502 of a lowest fuel usage 508. In response to the selection, navigation device 100 or route management server 150 may prioritize the route or routes that are expected to cause the HEV to use the least amount of fuel during the route. For example, navigation device 100 or route management server 150 may prioritize a route that has the highest amount of charging capability in a similar manner as described above. Alternatively, navigation device 100 or route management server 150 may prioritize a route that includes non-charging capable route segments that have a lower expected fuel consumption rate than other routes including non-charging capable route segments that have a higher expected fuel consumption rate even if the other route includes more overall charging capability in some aspects. For example, a first route including a route segment that has a lower speed limit (and thus a lower expected fuel consumption rate) than a second route including a route segment that has a higher speed limit. In another example, a route that is substantially flat may be prioritized over a route having a similar length and charging capability but that is hilly.

If the user selects the charging metric priority 502 of a cheapest commuting cost 510, navigation device 100 or route management server 150 may prioritize the route or routes that are expected to have the lowest overall commuting cost for the vehicle associated with navigation device 100. For example, navigation device 100 or route management server 150 may prioritize a route that minimizes an expected cost for travelling that route based on the average or expected number of miles per charge of the vehicle, the number of miles of the route being considered, and the average or expected cost per charge to calculate the total expected cost of travelling each of the one or more routes. Navigation device 100 or route management server 150 may also determine the expected cost of the route for HEVs based on the estimated miles per gallon or kilometers per liter of the HEV in addition to the other factors described above.

Figure 6:
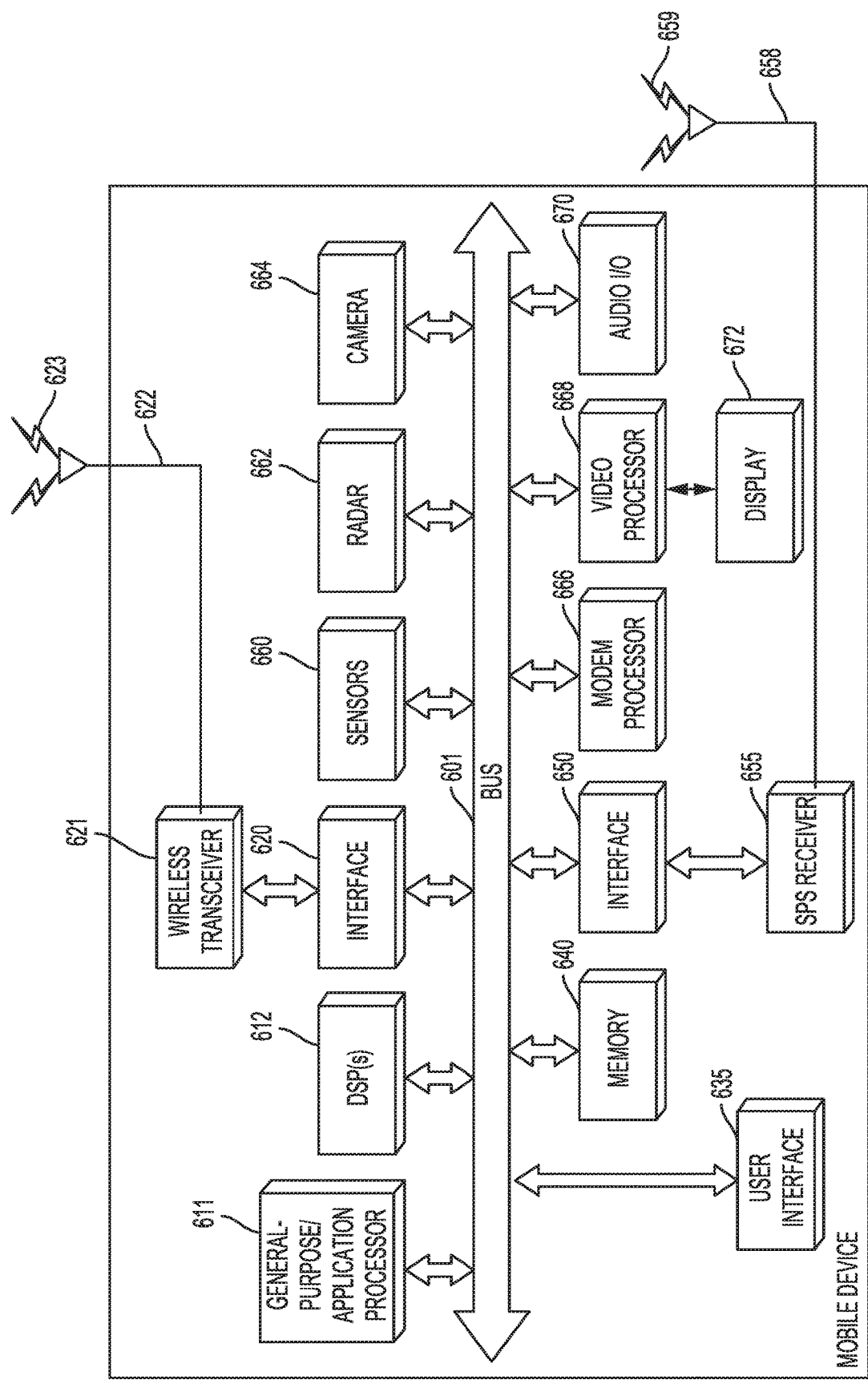
FIG. 6 is an example mobile device and the components within the mobile device in which aspects of the disclosure may be implemented.

FIG. 6 is a schematic diagram of a mobile device 600 according to an implementation. Navigation device 100 shown in FIG. 1 may be implemented as mobile device 600 or may comprise one or more features of mobile device 600 shown in FIG. 6. In certain implementations, mobile device 600 may comprise a wireless transceiver 621 which is capable of transmitting and receiving wireless signals 623 via wireless antenna 622 over a wireless communication network. Wireless transceiver 621 may be connected to bus 601 by a wireless transceiver bus interface 620. Wireless transceiver bus interface 620 may, in some implementations be at least partially integrated with wireless transceiver 621. Some implementations may include multiple wireless transceivers 621 and wireless antennas 622 to enable transmitting and/or receiving signals according to corresponding multiple wireless communication standards such as, for example, versions of IEEE Standard 802.11, CDMA, WCDMA, LTE, UMTS, GSM, AMPS, Zigbee, Bluetooth and a 5G or NR radio interface defined by 3GPP, just to name a few examples. In a particular implementation, wireless transceiver 621 may transmit signals on an uplink channel and receive signals on a downlink channel as discussed above. The wireless transceiver 621 may provide the capabilities of the device 600, destination, starting location or current location of the device 600 to the server 140.

Mobile device 600 may also comprise SPS receiver 655 capable of receiving and acquiring SPS signals 659 via SPS antenna 658 (which may be integrated with antenna 622 in some implementations). SPS receiver 655 may also process, in whole or in part, acquired SPS signals 659 for estimating a location of mobile device 600. In some implementations, general-purpose processor(s) 611, memory 640, digital signal processor(s) (DSP(s)) 612 and/or specialized processors (not shown) may also receive the SPS signals 659 via interface 650 and bus 601, and may be utilized to process acquired SPS signals, in whole or in part, and/or calculate an estimated location of mobile device 600, in conjunction with SPS receiver 655. Storage of SPS or other signals (e.g., signals acquired from wireless transceiver 621) or storage of measurements of these signals for use in performing positioning operations may be performed in memory 640 or registers (not shown). General-purpose processor(s) 611, memory 640, DSP(s) 612 and/or specialized processors may provide or support a location engine for use in processing measurements to estimate a location of mobile device 600. In a particular implementation, all or portions of actions or operations set forth for process 600 may be executed by general-purpose processor(s) 611 or DSP(s) 612 based on machine-readable instructions stored in memory 640.

Also shown in FIG. 6, digital signal processor(s) (DSP(s)) 612 and general-purpose processor(s) 611 may be connected to memory 640 through bus 601. A particular bus interface (not shown) may be integrated with the DSP(s) 612, general-purpose processor(s) 611 and memory 640. In various implementations, functions may be performed in response to execution of one or more machine-readable instructions stored in memory 640 such as on a computer-readable storage medium, such as RAM, ROM, FLASH, or disc drive, just to name a few examples. The one or more instructions may be executable by general-purpose processor(s) 611, specialized processors, or DSP(s) 612. Memory 640 may comprise a non-transitory processor-readable memory and/or a computer-readable memory that stores software code (programming code, instructions, etc.) that are executable by processor(s) 611 and/or DSP(s) 612. The processor(s) 611 and/or the DSP(s) 612 may be used to perform various operations as described throughout the specification. For example, the processor(s) 611, the DSP(s) 612 and/or wireless transceiver 621 in conjunction with memory 640 may be used to obtain a plurality of routes to the destination, similar to block 210. The processor(s) 611 and/or the DSP(s) 612 in conjunction with memory 640 determine a route to use from the plurality of determined routes based on an estimated localization uncertainty of each route and/or localization reliability of each route, similar to block 220.

Also shown in FIG. 6, a user interface 635 may comprise any one of several devices such as, for example, a speaker, microphone, display device, vibration device, keyboard, touch screen, just to name a few examples. In a particular implementation, user interface 635 may enable a user to interact with one or more applications hosted on mobile device 600. For example, devices of user interface 635 may store analog or digital signals on memory 640 to be further processed by DSP(s) 612 or general-purpose processor 611 in response to action from a user. Similarly, applications hosted on mobile device 600 may store analog or digital signals on memory 640 to present an output signal to a user. In another implementation, mobile device 600 may optionally include a dedicated audio input/output (I/O) device 670 comprising, for example, a dedicated speaker, microphone, digital to analog circuitry, analog to digital circuitry, amplifiers and/or gain control. Audio I/O 670 may also include ultrasound or any audio based positioning that can be used to determine the position, orientation or context of the mobile device 600. It should be understood, however, that this is merely an example of how an audio I/O may be implemented in a mobile device, and that claimed subject matter is not limited in this respect.

Mobile device 600 may also comprise a dedicated camera device 664 for capturing still or moving imagery. Camera device 664 may comprise, for example an imaging sensor (e.g., charge coupled device or CMOS imager), lens, analog to digital circuitry, frame buffers, just to name a few examples. In one implementation, additional processing, conditioning, encoding or compression of signals representing captured images may be performed at general purpose/application processor 611 or DSP(s) 612. Alternatively, a dedicated video processor 668 may perform conditioning, encoding, compression or manipulation of signals representing captured images. Additionally, video processor 668 may decode/decompress stored image data for presentation on a display 672 on mobile device 600.

Mobile device 600 may also comprise sensors 660 coupled to bus 601 which may include, for example, inertial sensors and environment sensors. Inertial sensors of sensors 660 may comprise, for example accelerometers (e.g., collectively responding to acceleration of mobile device 600 in three dimensions), one or more gyroscopes or one or more magnetometers (e.g., to support one or more compass applications). Environment sensors of mobile device 600 may comprise, for example, temperature sensors, barometric pressure sensors, ambient light sensors, camera imagers, microphones, just to name few examples. Sensors 660 may generate analog or digital signals that may be stored in memory 640 and processed by DSP(s) 612 or general-purpose application processor 611 in support of one or more applications such as, for example, applications directed to positioning or navigation operations. The sensors 660 may also include radar 662, which may be used to determine the distance between the device and another object. The sensors 660, SPS receiver 655, wireless transceiver 621, camera(s) 664, audio i/o 670, radar 662 or any combination thereof may be used determine one or more location measurements and/or a position location of the mobile device 600.

In a particular implementation, mobile device 600 may comprise a dedicated modem processor 666 capable of performing baseband processing of signals received and down converted at wireless transceiver 621 or SPS receiver 655. Similarly, modem processor 666 may perform baseband processing of signals to be upconverted for transmission by wireless transceiver 621. In alternative implementations, instead of having a dedicated modem processor, baseband processing may be performed by a general-purpose processor or DSP (e.g., general purpose/application processor 611 or DSP(s) 612). It should be understood, however, that these are merely examples of structures that may perform baseband processing, and that claimed subject matter is not limited in this respect.

Figure 7:
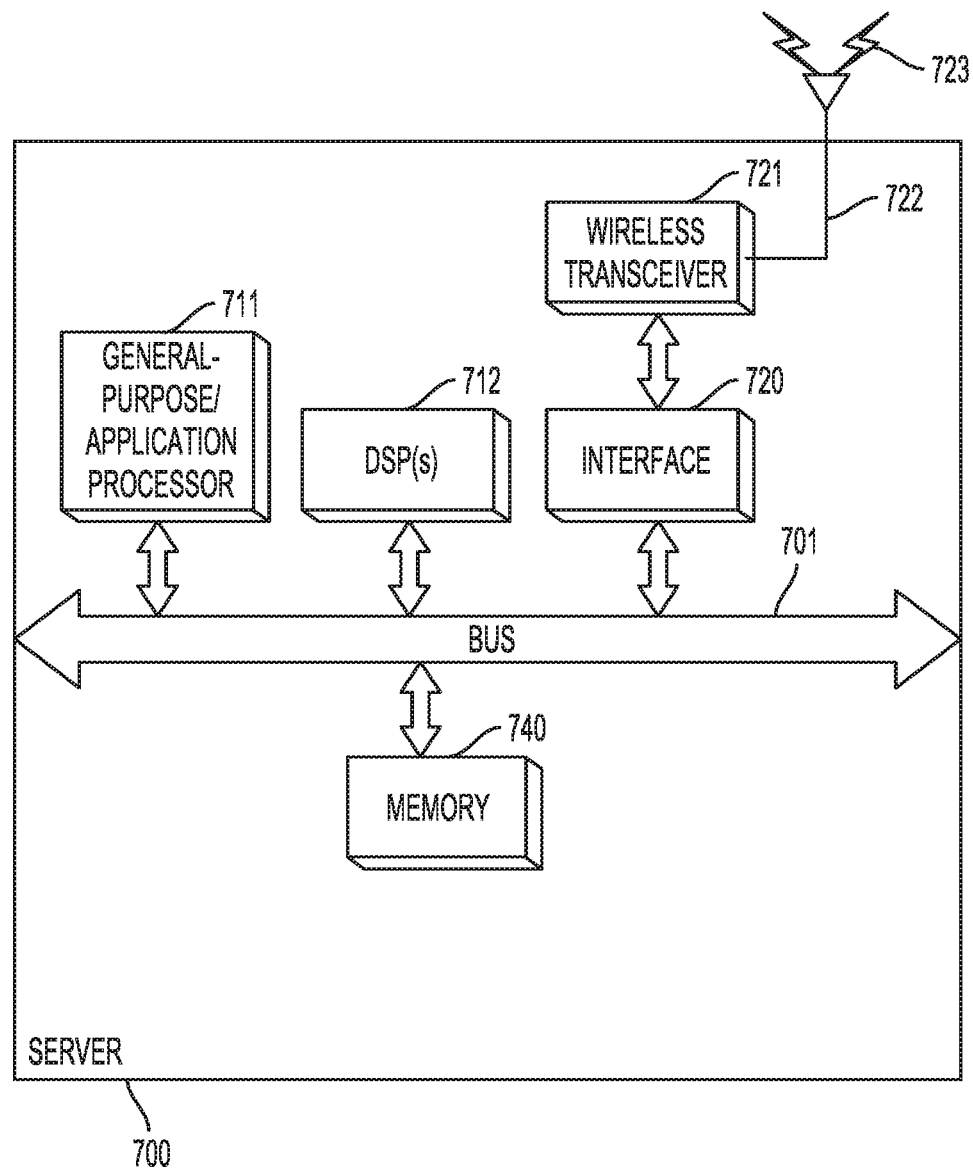
FIG. 7 is an example server and the components within the server in which aspects of the disclosure may be implemented.

FIG. 7 is a schematic diagram of a server 700 according to an implementation. Server 140 and server 150 (both shown in FIG. 1) may comprise one or more features of server 700 shown in FIG. 7. In certain implementations, server 700 may comprise a wireless transceiver 721 which is capable of transmitting and receiving wireless signals 723 via wireless antenna 722 over a wireless communication network. Wireless transceiver 721 may be connected to bus 701 by a wireless transceiver bus interface 720. Wireless transceiver bus interface 720 may, in some implementations be at least partially integrated with wireless transceiver 721. Some implementations may include multiple wireless transceivers 721 and wireless antennas 722 to enable transmitting and/or receiving signals according to corresponding multiple wireless communication standards such as, for example, versions of IEEE Standard 802.11, CDMA, WCDMA, LTE, UMTS, GSM, AMPS, Zigbee, Bluetooth and a 5G or NR radio interface defined by 3GPP, just to name a few examples. In a particular implementation, wireless transceiver 721 may transmit signals on an uplink channel and receive signals on a downlink channel as discussed above.

The server 700 may include a wired interface (not shown in FIG. 7), such as ethernet, coaxial cable, etc. The server 700 may obtain a plurality of routes via the wireless transceiver 721 and/or a wired interface.

The server 700, via one or more wired interfaces (not shown in FIG. 7) and/or one or more wireless transceivers 721, may obtain a plurality of location measurement reports from a plurality of devices, wherein the location measurement reports contain one or more parameters related to location measurements that correspond to the route or segment of the route, similar to block 510.

Also shown in FIG. 7, digital signal processor(s) (DSP(s)) 712 and general-purpose processor(s) 711 may be connected to memory 740 through bus 701. A particular bus interface (not shown) may be integrated with the DSP(s) 712, general-purpose processor(s) 711 and memory 740. In various implementations, functions may be performed in response to execution of one or more machine-readable instructions stored in memory 740 such as on a computer-readable storage medium, such as RAM, ROM, FLASH, or disc drive, just to name a few examples. The one or more instructions may be executable by general-purpose processor(s) 711, specialized processors, or DSP(s) 712. Memory 740 may comprise a non-transitory processor-readable memory and/or a computer-readable memory that stores software code (programming code, instructions, etc.) that are executable by processor(s) 711 and/or DSP(s) 712. The processor(s) 711 and/or the DSP(s) 712 may be used to perform various operations as described throughout the specification.

Discussions of coupling between components in this specification do not require the components to be directly coupled. These components may be coupled directly or through one or more intermediaries. Additionally, coupling does not require they be directly attached, but it may also include electrically coupled, communicatively coupled or any combination thereof.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In another aspect, as previously mentioned, a wireless transmitter or access point may comprise a cellular transceiver device, utilized to extend cellular telephone service into a business or home. In such an implementation, one or more mobile devices may communicate with a cellular transceiver device via a code division multiple access ("CDMA") cellular communication protocol, for example.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

What is claimed is:

1. A navigation device for providing a route to a destination, the navigation device comprising:
    a memory;
    a user interface;
    a wireless transceiver;
    a satellite positioning system (SPS) receiver; and
    a processor, coupled to the memory, the user interface, the wireless transceiver and the SPS receiver, configured to:
        determine, using the SPS receiver, a starting location;
        receive, via the user interface, a destination location and a route selection criteria, wherein the route selection criteria comprise a charging metric, distance, or time to arrival or a combination thereof;
        send to a route management server, using the wireless transceiver, the starting location, the destination location and the route selection criteria;
        receive, using the wireless transceiver, at least two routes, wherein the at least two routes are based at least in part upon the route selection criteria and comprise a route prioritizing the charging metric and a route prioritizing the time to arrival; and
        display, on the user interface, the at least two routes and an associated time to arrival and an associated charging metric for each route.

2. The navigation device of claim 1, wherein the processor is further configured to receive the at least two routes and a metric for each of the at least two routes from the route management server.

3. The navigation device of claim 1, wherein the processor is further configured to receive, via the wireless transceiver, charging lane information identifying a charging capability for one or more lanes associated with the at least two routes.

4. The navigation device of claim 3, wherein the processor is further configured to determine the charging metric for each of the at least two routes based on the charging lane information.

5. The navigation device of claim 3, wherein the processor is further configured to provide a filtered list of routes that include only the at least two routes that include one or more lanes having charging capability.

6. The navigation device of claim 5, wherein the processor is further configured to determine that the navigation device is in communication with a vehicle capable of being charged and display the filtered list of routes to the user interface in response to the determination that the navigation device is in communication with a vehicle capable of being charged.

7. The navigation device of claim 3, wherein the processor is further configured to detect charging capability for a lane that is not included in the received charging lane information and transmit information of the detected charging capability to the route management server.

8. The navigation device of claim 3, wherein the processor is further configured to receive congestion information for at least one lane of each route having charging capability and include the congestion information in the charging metric.

9. The navigation device of claim 8, wherein the congestion information includes first usage information that is derived from crowd-sourced data received from a first group of vehicles that are travelling in a first lane that has charging capability and second usage information that is derived from crowd-sourced data received from a second group of vehicles that are travelling in a second lane that does not have charging capability.

10. The navigation device of claim 1, wherein the charging metric includes an expected level of charge of a battery of a vehicle associated with the navigation device at an end of each of the at least two routes.

11. The navigation device of claim 1, wherein the charging metric for each of the at least two routes includes a percentage of each route that is charging capable.

12. The navigation device of claim 4, wherein the charging metric includes an expected cost of travelling each of the at least two routes.

13. The navigation device of claim 9, wherein the first group of vehicles are capable of being charged and wherein the second group of vehicles are not capable of being charged.

14. The navigation device of claim 1, wherein the processor is further configured to transmit a battery status, the destination location, and a detected charging capability of a lane associated with at least one of the at least two routes to the route management server.

15. The navigation device of claim 1, wherein the at least two routes comprise a first route that has a shortest expected time of arrival at the destination location, a second route that has a shortest distance to the destination location, and a third route that has a highest charging capability.

16. The navigation device of claim 1, wherein the processor is further configured to provide a set of suggested routes to the user interface from the at least two routes, wherein the set of suggested routes is based on a charging lane availability of one or more lanes of the two or more routes.

17. The navigation device of claim 16, wherein the processor is further configured to provide a suggested departure time, a speed at which to drive a vehicle associated with the navigation device, or an adjustment to at least one of the at least two routes based on the charging lane availability.

18. A method of providing a route to a destination on a navigation device, the method comprising:
   determining, using a satellite positioning system (SPS) receiver, a starting location;
   receiving a destination location and a route selection criteria, wherein the route selection criteria comprise a charging metric, distance, or time to arrival or a combination thereof;
   sending, to a route management server, the starting location, the destination location, and the route selection criteria;
   receiving at least two routes, wherein the at least two routes are based at least in part upon the route selection criteria and comprise a route prioritizing the charging metric and a route prioritizing the time to arrival; and
   displaying the at least two routes and an associated time to arrival and an associated charging metric for each route.

19. The method of claim 18, further comprising:
   determining a charging capability of one or more lanes associated with each of the at least two routes; and
   creating a filtered list of routes that include only routes that include one or more lanes having charging capability.

20. The method of claim 18, further comprising:
   receiving charging lane information identifying a charging capability for one or more lanes of the at least two routes;
   detecting charging capability for a lane that is not included in the received charging lane information; and
   transmitting information of the detected charging capability to the route management server.

21. The method of claim 18, further comprising presenting a set of suggested routes to a user interface, wherein the route selection criteria further comprise a criteria including the charging metric, the distance, and the time to arrival and wherein the at least two routes comprise a first route that has a shortest expected time of arrival at the destination location, a second route that has a shortest distance to the destination location, and a third route that has a highest charging metric.

22. A navigation device for providing a route to a destination, the navigation device comprising:
   means for determining a starting location;
   means for receiving a destination location and a route selection criteria, wherein the route selection criteria comprise a charging metric, distance, or time to arrival or a combination thereof;
   means for sending, to a route management server, the starting location, the destination location, and the route selection criteria;
   means for receiving at least two routes, wherein the at least two routes are based at least in part upon the route selection criteria and comprise a route prioritizing the charging metric and a route prioritizing the time to arrival; and
   means for displaying, the at least two routes and an associated time to arrival and an associated charging metric for each route.

23. The navigation device of claim 22, further comprising:
   means for determining a charging capability of one or more lanes associated with each of the two or more routes; and
   means for providing a filtered list of routes that include only routes that include one or more lanes having charging capability.

24. The navigation device of claim 22, further comprising:
   means for receiving charging lane information identifying a charging capability for one or more lanes of the two or more routes;
   means for detecting charging capability for a lane that is not included in the received charging lane information; and
   means for transmitting information of the detected charging capability to the route management server.

25. The navigation device of claim 22, wherein the route selection criteria further comprise a criteria including the charging metric, the distance, and the time to arrival and wherein the means for displaying the two or more routes is further configured to display a first route that has a shortest expected time of arrival at the destination location, a second route that has a shortest distance to the destination location, and a third route that has a highest charging metric.

26. A non-transitory computer-readable medium having instructions stored thereon that, when executed by a processor, cause the processor to:
   determine, using a satellite positioning system (SPS) receiver, a starting location;
   receive a destination location and a route selection criteria, wherein the route selection criteria comprise a charging metric, distance, or time to arrival or a combination thereof;
   send to a route management server, using the wireless transceiver, the starting location, the destination location and the route selection criteria;
   receive, using a wireless transceiver, at least two routes, wherein the at least two routes are based at least in part upon the route selection criteria and comprise a route prioritizing the charging metric and a route prioritizing the time to arrival; and
   display the at least two routes and an associated time to arrival and an associated charging metric for each route.

27. The non-transitory computer-readable medium of claim 26, wherein the instructions further cause the processor to:
   determine a charging capability of one or more lanes associated with each of the two or more routes; and
   create a filtered list of routes that include only routes that include one or more lanes having charging capability.

28. The non-transitory computer-readable medium of claim 26, wherein the instructions further cause the processor to:

receive charging lane information identifying a charging capability for one or more lanes of the two or more routes;

detect charging capability for a lane that is not included in the received charging lane information; and transmit information of the detected charging capability to the route management server.

29. The non-transitory computer-readable medium of claim 26, wherein the route selection criteria further comprise a combination criteria including the charging metric, the distance, and the time to arrival and wherein instructions to display the at least the two routes comprise instructions to display a first route that has a shortest expected time of arrival at the destination location, a second route that has a shortest distance to the destination location, and a third route that has a highest charging metric.

* * * * *